United States Patent
Roddis

(10) Patent No.: US 8,011,668 B2
(45) Date of Patent: Sep. 6, 2011

(54) CLOSE COUPLED MECHANICAL SEAL

(75) Inventor: Alan James Roddis, Sheffield (GB)

(73) Assignee: AES Engineering Ltd, Rotherham (GB)

( * ) Notice: Subject to any disclaimer, the term of this patent is extended or adjusted under 35 U.S.C. 154(b) by 0 days.

(21) Appl. No.: 11/252,853

(22) Filed: Oct. 18, 2005

(65) Prior Publication Data

US 2006/0082071 A1  Apr. 20, 2006

(30) Foreign Application Priority Data

Oct. 18, 2004 (GB) .................................... 0423087.6

(51) Int. Cl.
*F16J 15/34* (2006.01)
(52) U.S. Cl. ...................................................... 277/408
(58) Field of Classification Search .................. 277/358, 277/361, 365, 367, 368, 370, 371, 375, 387, 277/388, 408
See application file for complete search history.

(56) References Cited

U.S. PATENT DOCUMENTS

| | | | | |
|---|---|---|---|---|
| 2,818,284 A * | 12/1957 | Stevens | ............................ | 277/370 |
| 4,114,899 A * | 9/1978 | Kulzer et al. | ................... | 277/367 |
| 4,872,689 A * | 10/1989 | Drumm | ............................. | 277/408 |
| 5,039,113 A * | 8/1991 | Gardner | .......................... | 277/379 |
| 5,375,852 A * | 12/1994 | Charhut | ........................... | 277/371 |
| 5,468,002 A | 11/1995 | Wasser | | |
| 5,489,105 A * | 2/1996 | Attenasio et al. | ............... | 277/370 |
| 5,681,047 A * | 10/1997 | Klostermann et al. | ......... | 277/400 |
| 5,938,205 A | 8/1999 | Azibert et al. | | |
| 6,224,061 B1* | 5/2001 | Roddis | ............................ | 277/370 |
| 6,325,382 B1* | 12/2001 | Iwamoto et al. | ................ | 277/368 |
| 6,454,268 B1* | 9/2002 | Muraki | ............................ | 277/361 |
| 6,935,632 B2* | 8/2005 | Azibert et al. | ................... | 277/370 |
| 7,252,291 B2* | 8/2007 | Khonsari et al. | ................ | 277/360 |
| 2004/0026871 A1* | 2/2004 | Stephens et al. | ................ | 277/401 |
| 2004/0169336 A1* | 9/2004 | Azibert et al. | ................... | 277/370 |
| 2004/0227297 A1* | 11/2004 | Azibert | ........................... | 277/361 |

FOREIGN PATENT DOCUMENTS

| | | |
|---|---|---|
| EP | 0 032 433 A1 | 7/1981 |
| GB | 1301309 | 12/1972 |
| GB | 2 012 376 A | 7/1979 |
| WO | WO 2004/090392 A1 | 10/2004 |

OTHER PUBLICATIONS

Search Report Under Section 17(5), GB Application GB0521138.8, Feb. 24, 2006.

* cited by examiner

*Primary Examiner* — Thomas Beach
*Assistant Examiner* — Gilbert Y Lee
(74) *Attorney, Agent, or Firm* — Myers Bigel Sibley & Sajovec

(57) ABSTRACT

The present invention provides a modular gland member for use in a mechanical seal, wherein the gland member has a radially or axially extending cavity adjacent to a seal face, and the cavity includes a solid or fluid thermal conducting member to dissipate heat from the seal face into the surrounding components.

5 Claims, 5 Drawing Sheets

CLOSE COUPLED MECHANICAL SEAL

CROSS REFERENCE TO RELATED APPLICATION

This application claims the benefit under 35 USC §119 of Great Britain Patent Application No. GB 0423087.6, filed on Oct. 18, 2004, the disclosure of which is hereby incorporated herein by reference in its entirety as if set forth fully herein.

FIELD OF THE INVENTION

This invention relates to mechanical seals and their use in rotating equipment, especially pumps, mixers, agitators and drying equipment. submersible pumps. However, the use of such seals may extend well beyond the use in such equipment and accordingly, while reference will be made below to pumps, it should be understood that this term is used, as far as the present invention is concerned, in connection with such having wider uses.

BACKGROUND TO THE INVENTION

Mechanical seals are used in a wide variety of industrial applications. Often, the sealing applications necessitate the use of a gas barrier system. This means that the seal faces must run "dry", as herewith described.

As recognized by one skilled in the art, typically, mechanical seal faces utilize a fluid film. This fluid film is positioned between the pair of seal faces and acts to lubricate and cool the seal faces during dynamic operation.

If a pair of seal faces is utilized to seal a marginal lubrication fluid and/or a gas, for example nitrogen, the fluid film may also be considered to be a gas. Such a fluid film may provide very little seal face lubrication, which may result in a high amount of heat generation. Such heat may be dissipated into the respective mechanical seal faces. There are many factors, which will increase the heat generated between the pair of mechanical seal faces. Pressure and counter rotational surface speed are two of such factors.

Heat between mechanical seal faces may be undesirable for at least the following reasons:

Firstly, some environments contain gases which can auto ignite should the gas come into contact with heated surfaces. In the case of a mechanical seal, seal faces running at elevated temperatures may increase the possibility of a problem and/or may reduce the possibility of their wide application. The European directive, which describes such environments, is discussed in 94/9/EC. Further information is contained in DIN EN1127-1:1997, prEN13463-1:2001, prEN13463-5:2000 and prEN13463-6:2002.

Secondly, this condition may also increase seal face deterioration and reduce seal face life.

It is deemed advantageous if a seal design is created which reduces the heat transferred into a seal face, which is operating in poor fluid film conditions.

DETAILED DESCRIPTION

Figure 1:
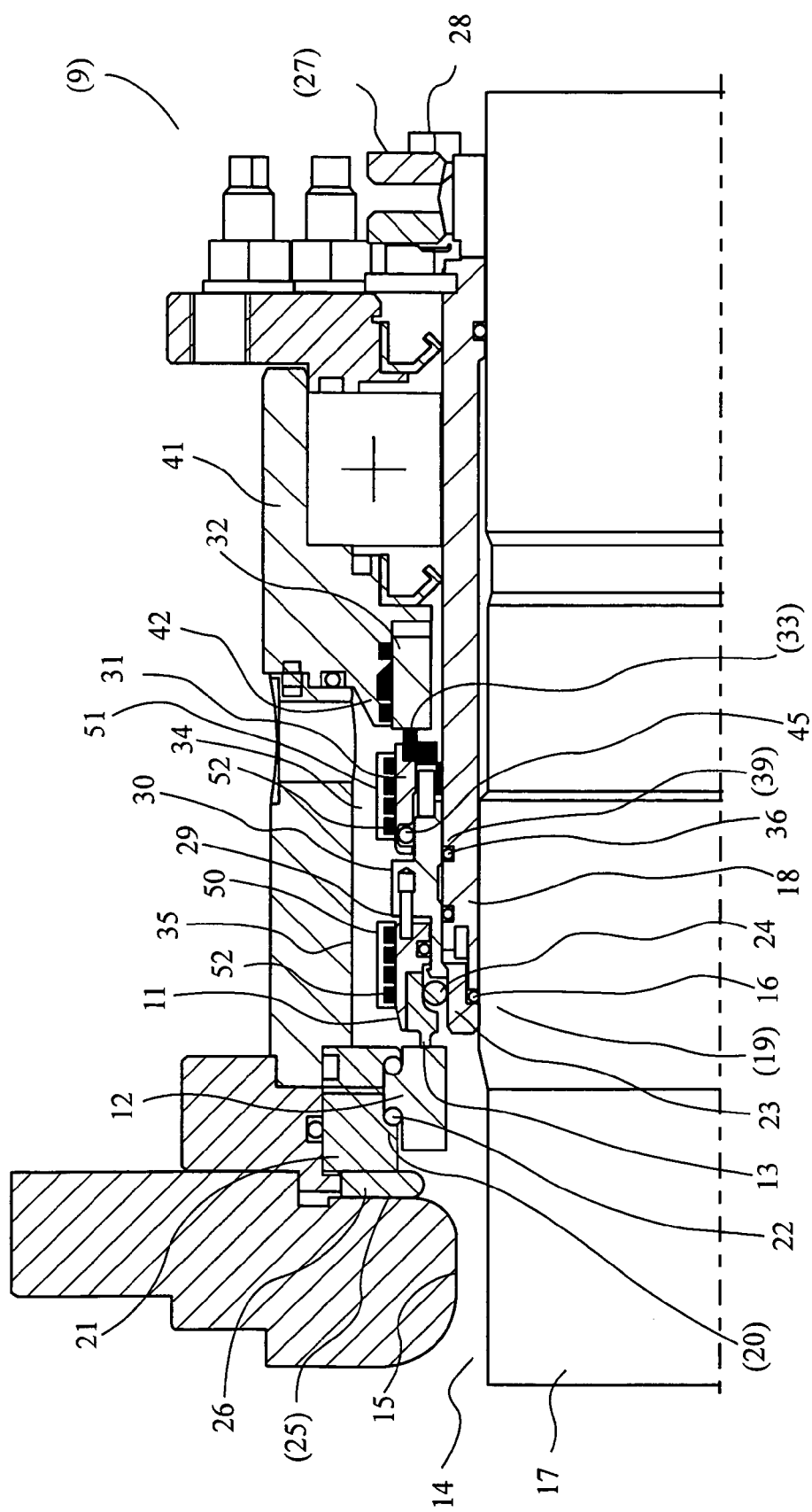
FIG. 1 shows a partial cross-sectional view of a mechanical seal and a close coupled stationary seat over the outboard seal face of a double mechanical seal according to some embodiments of the invention.

The foregoing and other aspects of the present invention will now be described in more detail with respect to embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

Unless otherwise defined, all terms, including technical and scientific terms used in the description, have the same meaning as commonly understood by one of ordinary skill in the art to which this invention belongs.

All publications, patent applications, patents, and other references mentioned herein are incorporated by reference in their entirety.

A mechanical seal comprises a "floating" component, which is mounted axially movably around the rotary shaft of, for example, a pump and a "static" component, which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more spring or retaining members. In use, one of the floating and static components rotates; this component may therefore be referred to as the rotary component. The other of the floating and static components does not rotate and may be referred to as the stationary component.

Those seals whose floating component is rotary are described as rotary seals. If the floating component is stationary, the seal may be referred to as a stationary seal.

If the sliding seal between the Rotary and Stationary components are assembled and pre-set prior to dispatch from the Mechanical seal manufacturing premises, the industry terminology for this is "cartridge seal."

If the Rotary and Stationary components are dispatched individually (unassembled) from the mechanical seal manufacturing premises, the industry terminology for this is "component seal"

Mechanical seals are used in all types of industries to seal a variety of different process media and operating conditions. The general industry term which defines the area adjacent to the process media is "inboard". The industry term which defines the area adjacent to the atmospheric side is "outboard".

From FIG. 1, which shows a cross sectional view of a mechanical seal (9) according to some embodiments of the invention.

At the inboard side of the seal, the rotary and axially floating seal face (11) is spring biased towards an axially static stationary seal face (12). The rotary seal face (11) may be allowed to slide on the stationary seal face (12). The interface between the rotary seal face (11) and stationary seal face (12) may form sealing area (13). This sealing area (13) may be the primary seal that prevents the process media (14) from escaping from the process chamber (15).

In addition to the sliding seal face (13), the process media (14) may be sealed by a sleeve elastomer (16) in contact with the shaft (17) and sleeve (18). This has been termed the first secondary sealing area (19).

The second secondary sealing area (20) may be formed between stationary seal face (12) and stationary gland (21) using elastomer (22).

The third secondary sealing area (23) may be formed between the rotary seal face (11) and the sleeve (18) using elastomer (24).

The fourth secondary sealing area (25) may be formed between the gland (21) and the process chamber (15) using u-shape elastomer (26).

The four secondary sealing devices and the primary sliding sealing interface may prevent the process media (14) from escaping.

A clamp ring assembly (27) includes screws (28) which may secure the sleeve (18) to the shaft (17) and transmit rotational drive from the shaft (17) into the clamp ring assembly (27) and sleeve (18). The rotational drive is transmitted to the rotary seal face (11) by at least one drive mechanism (29).

At the outboard side of the seal, the rotary and axially floating seal face (31) is spring biased towards an axially static stationary seal face (32). The rotary seal face (31) may be allowed to slide on the stationary seal face (32). The interface between the rotary seal face (31) and stationary seal face (32) forms sealing area (33). This sealing area (33) may be the primary seal that prevents the barrier media (34) from escaping from the barrier chamber (35).

In addition to the sliding seal face (33), the barrier media (34) may be sealed by a inner barrel elastomer (36) in contact with the sleeve (18). This has been termed the first secondary sealing area (39).

The second secondary sealing area (40) may be formed between stationary seal face (32) and stationary gland (41) using elastomer (42).

The third secondary sealing area (43) may be formed between the rotary seal face (31) and the inner barrel (30) using elastomer (45).

The three secondary sealing devices and the primary sliding sealing interface may prevent the barrier media (34) from escaping.

The inboard rotary seal face (11) and outboard rotary face (31) may have damper members (50) and (51) may be supported by at least one damper elastomer (52) on the respective outer circumferences of the rotaries.

Figure 2:
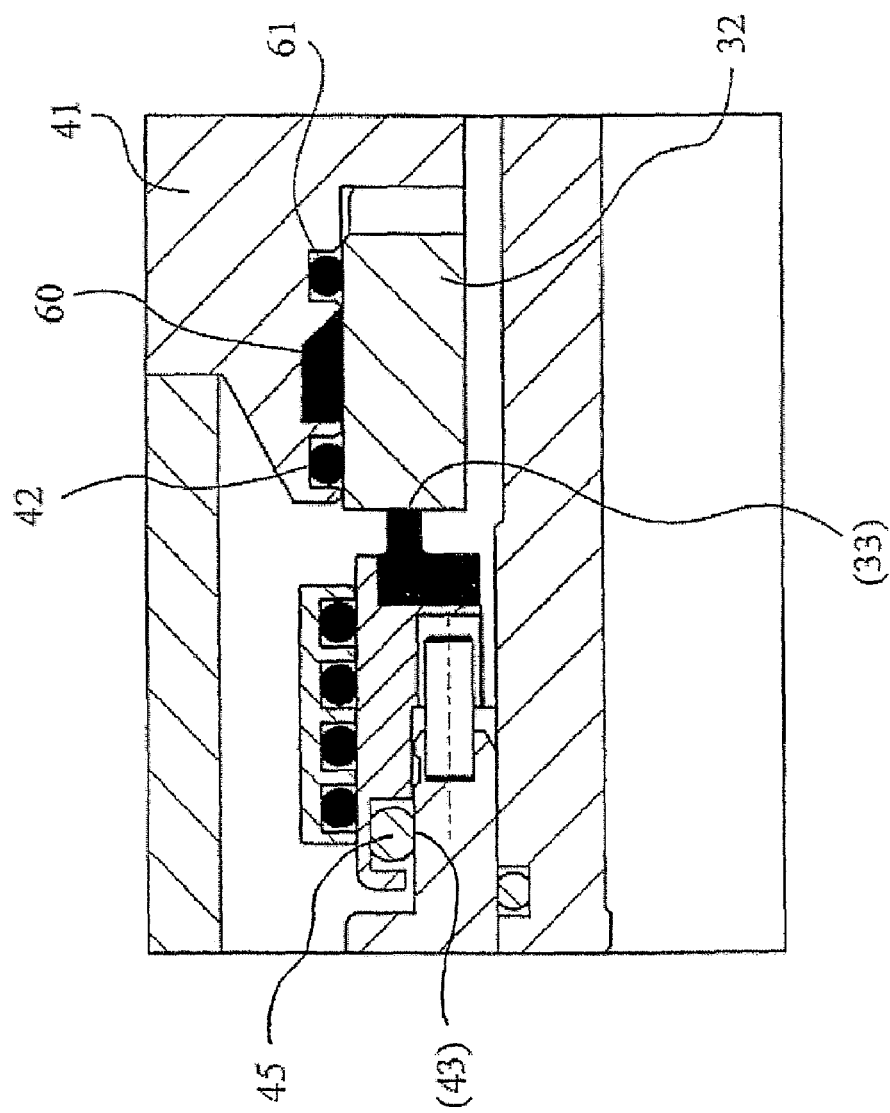
FIG. 2 corresponds to FIG. 1 and shows an enlarged view of the close-coupled stationary seat according to some embodiments of the invention.

From FIG. 2, axially adjacent to the outboard stationary elastomer (42) may be a close coupled device (60) in radial contact with said stationary (32) on its inner most surface, and in radial contact with the gland (41) on its outer most surface.

Axially adjacent to the close coupled device (60) may be a further stationary elastomer (61) which, in the case of FIG. 2, may be employed to help radially support the stationary seal face (32).

In dynamic operation, heat may be created from the sliding surface (33). The heat may be transferred into the stationary seal face (32). With conventional seal faces, the stationary elastomer (42) and/or (61) may act to insulate the seal face, and thus, the heat generated may not dissipate into the gland to a desirable extent.

From FIG. 2, the close coupled member (60) may be manufactured from a material, which is relatively conductive and acts to transfer heat from the stationary seal face (32) to the gland (41), and thus, may dissipate the heat to a desirable extent thereby reducing the total heat build up in a given operating scenario.

It has been found that the larger the close coupled surface area, in contact with the seal face (32) and gland (41), the better the ability of the mechanical seals according to some embodiments of the invention to remove undesirable heat build up.

Figure 3A:
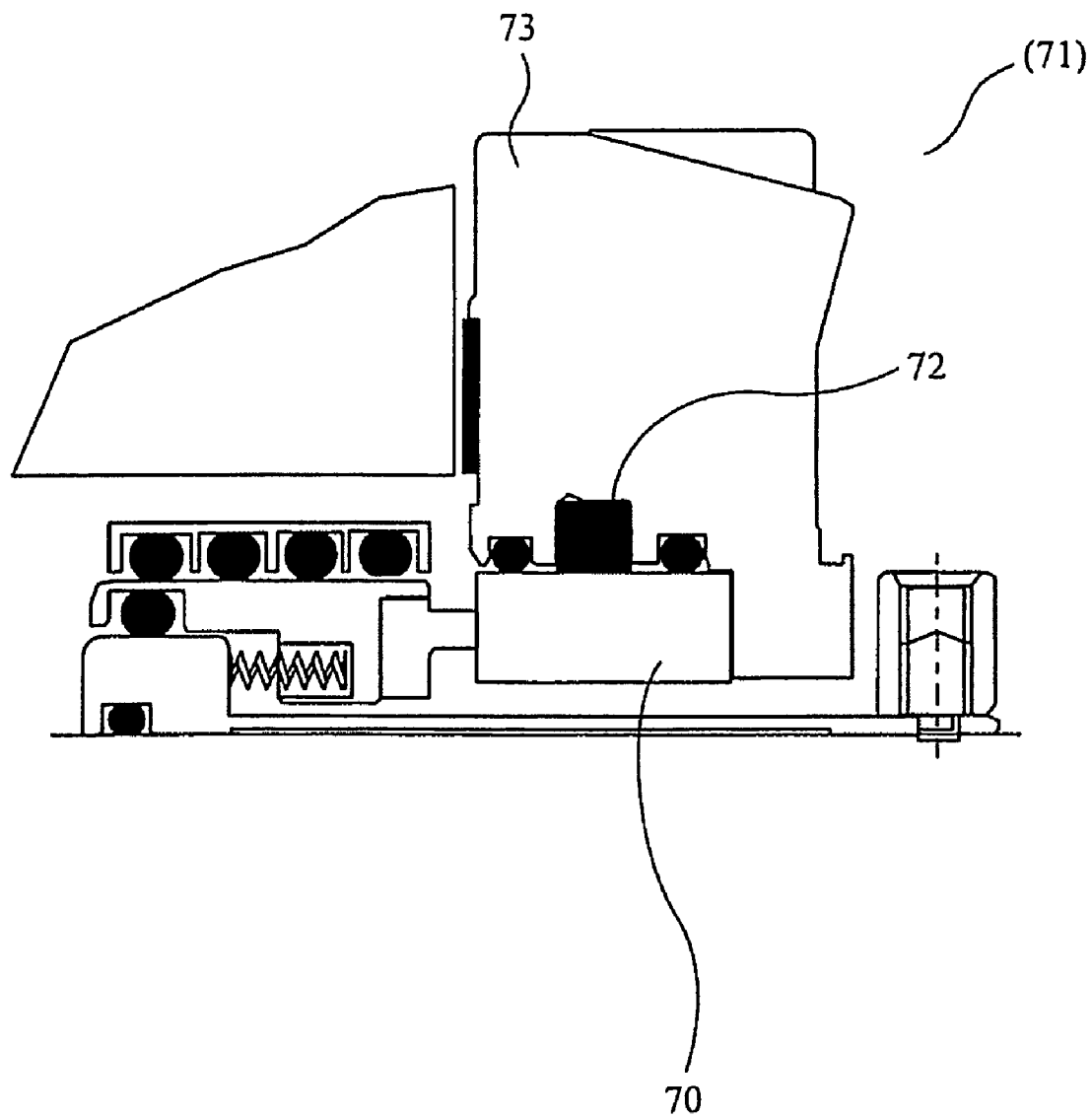
FIG. 3a corresponds to FIG. 1 and shows the close coupled stationary seat on the inboard side of a single cartridge mechanical seal according to some embodiments of the invention.

By way of example only, FIG. 3a, shows the close coupled stationary seat (70) on the inboard side of a single cartridge mechanical seal (71) according to some embodiments of the invention with conductive close coupled member (72) between the stationary seat (70) and gland (73).

Figure 3B:
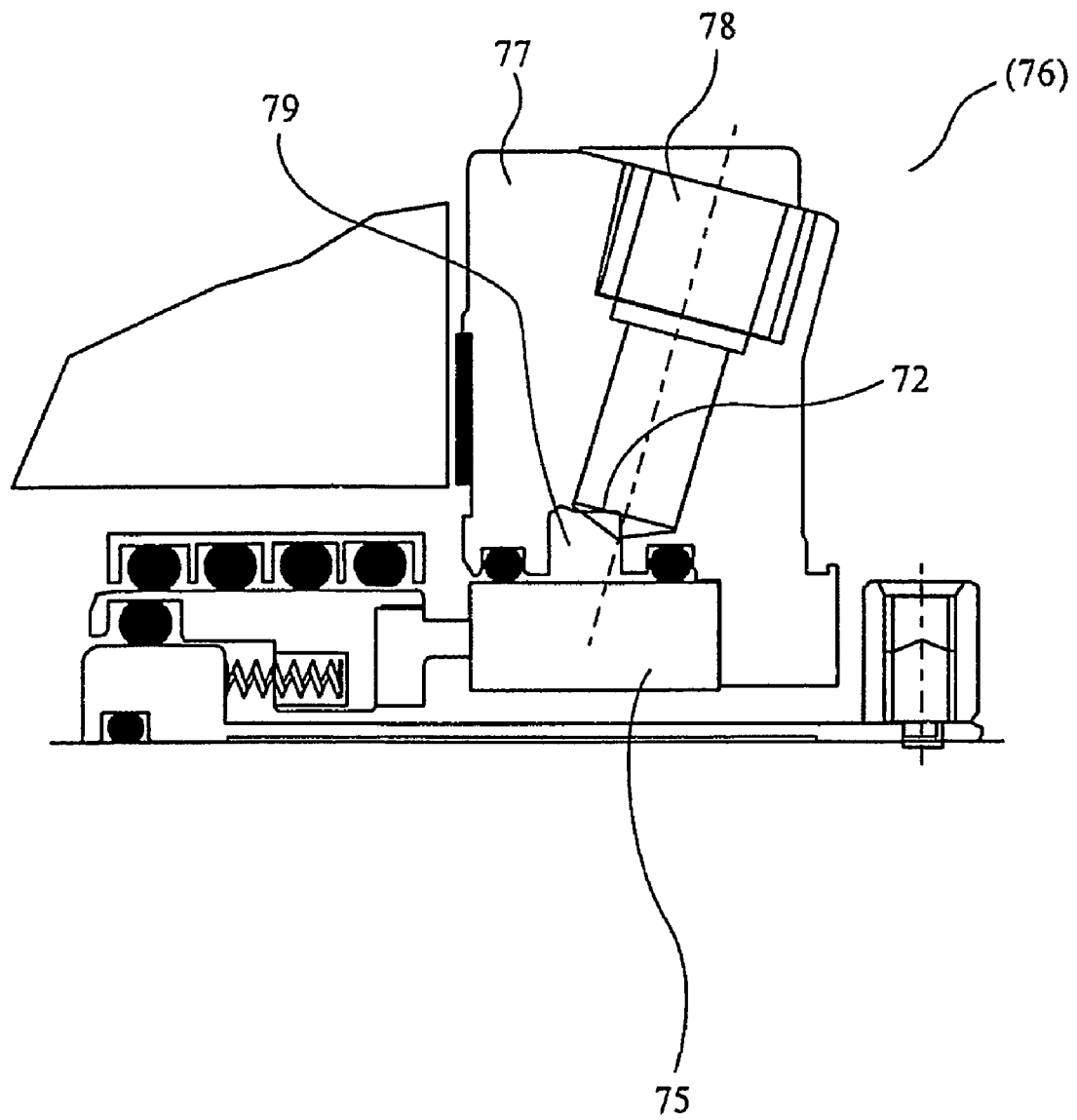
FIG. 3b corresponds to FIG. 3a and shows the modular close coupled stationary seat on the inboard side of a single cartridge mechanical seal employed with a cooled seat according to some embodiments of the invention.

By way of example only, FIG. 3b, corresponds to FIG. 3a and shows the close coupled stationary seat (75) on the inboard side of a single cartridge mechanical seal (76) according to some embodiments of the invention with the conductive close coupled member missing leaving an open gland cavity (79) in gland (77). A heat transfer fluid orifice (78) connects the gland cavity (79) to the outer most radial area of the gland (77). As previously described, heat transfer fluid may then cool the stationary seat (75).

Figure 4:
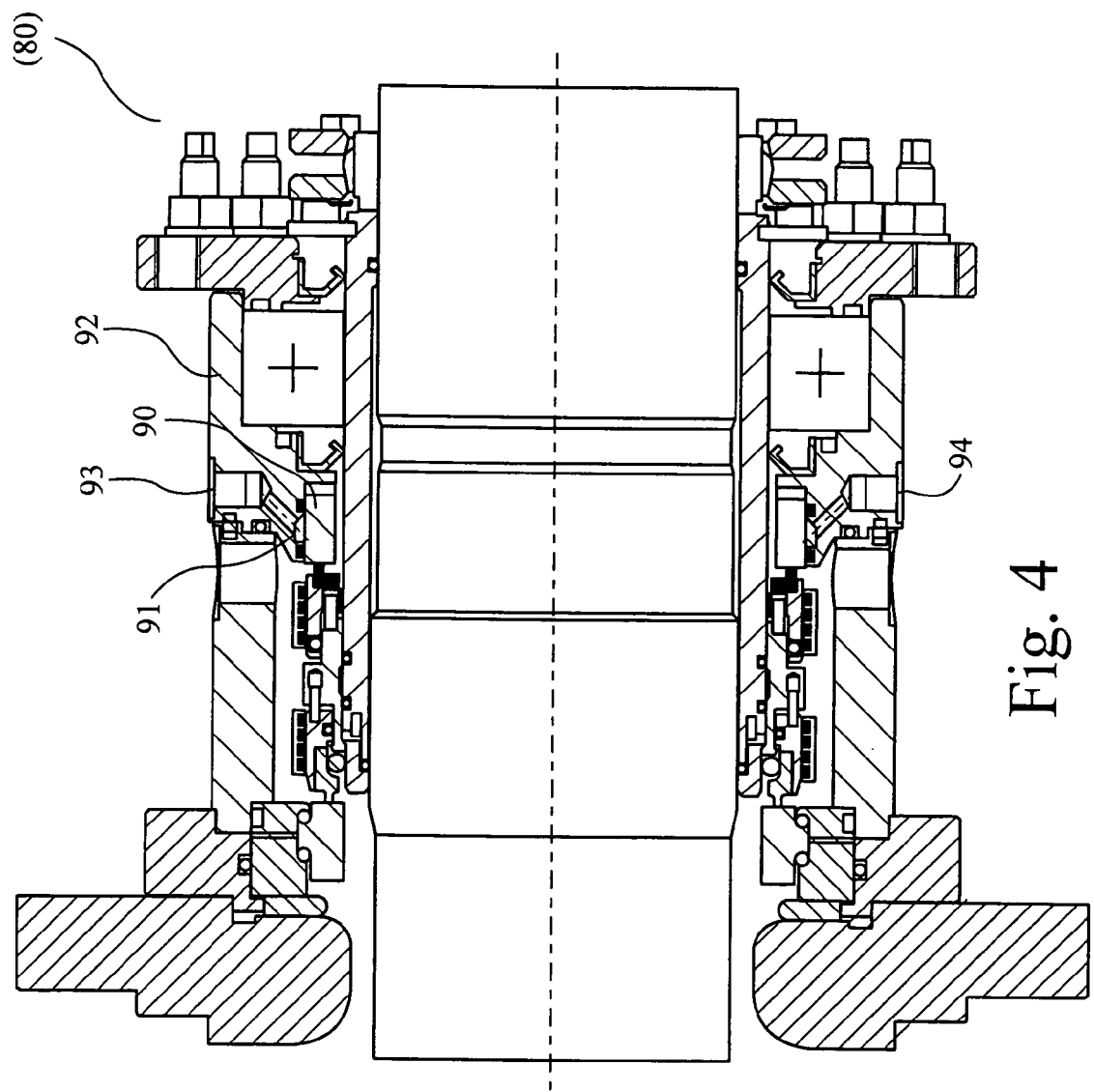
FIG. 4 corresponds to FIG. 1 and shows the modular close coupled stationary seat operating as a fluid cooled arrangement according to some embodiments of the invention.

FIG. 4, corresponds to FIG. 1 and shows a cross sectional view of mechanical seal (80). From FIG. 4, the modular close coupled stationary seat (90) operating as a fluid cooled arrangement according to some embodiments of the invention. In such an application, the gland cavity (91) in gland (92) is left unoccupied and without a heat transfer member. In some embodiments, the gland cavity (91) may have at least one inlet orifice (93), and in some embodiments, at least one outlet orifice (94).

A cooling medium and/or fluid such as water, may enter the inlet orifice (93), circulates around the outer radial portion of the stationary seat (90) and may exit the outlet orifice (94). Heat may be transferred from the stationary seat (92) into the heat transfer fluid.

According to some embodiments of the invention, a modular gland member can be employed for both close coupled product offerings and cooled seat product offerings.

While the present invention has been particularly shown and described with reference to some embodiments thereof, it will be understood by those of ordinary skill in the art that various changes in form and details may be made therein without departing from the spirit and scope of the present invention as defined by the following claims.

That which is claimed is:

1. A mechanical seal comprising at least one pair of seal members including a stationary seal member having a stationary seal face and a rotary seal member having a rotary seal face, the stationary seal face and rotary seal face being axially biased together by one or more biasing members, a gland member surrounding at least a portion of said stationary seal face, sealing means provided between said gland member and said stationary seal face and configured to provide sealing therebetween, and a cavity which radially extends into said gland member at a position where the gland member surrounds at least a portion of said stationary seal face and which opens onto an outer surface of said stationary seal member without opening onto said rotary seal member so that the cavity is not in fluid contact with the rotary seal member, the mechanical seal further comprising inlet and outlet orifices extending between said cavity and an outer surface of the gland member, wherein said cavity is an annular cavity which surrounds and is radially outside said stationary seal face, and said cavity is devoid of said stationary seal member.

2. A cartridge mechanical seal comprising a mechanical seal according to claim 1.

3. A mechanical seal according to claim 1, further comprising a heat transfer passage configured to receive a fluid that dissipates heat away from the stationary seal face.

4. A mechanical seal comprising at least one pair of seal members including a stationary seal member having a stationary seal face and a rotary seal member having a rotary seal face which are axially biased together by one or more biasing members, a gland member surrounding at least a portion of said stationary seal face, sealing means provided between the gland member and the stationary seal face and configured to provide sealing therebetween, and wherein the gland member comprises a body having an inner surface adjacent the stationary seal, an opposing outer surface on a side thereof opposite the inner surface, a gland cavity formed on the inner surface and radially extending into the gland member body at a position where the gland member surrounds at least a portion of said stationary seal face and opens onto an outer surface of said stationary seal member without opening onto said rotary seal member so that the cavity is not in fluid contact with the rotary seal member, and a heat transfer passage that radially extends through the gland member body between the gland cavity and the outer surface of the gland member body and fluidly connects the gland cavity to the outer surface of the gland member, wherein said cavity is an annular cavity which surrounds and is radially outside said stationary seal face, and said cavity is devoid of said stationary seal member.

5. A mechanical seal according to claim 4, wherein the heat transfer passage is configured to receive a fluid that dissipates heat away from the stationary seal face.

* * * * *